United States Patent
Shatsky et al.

(10) Patent No.: US 12,124,407 B2
(45) Date of Patent: Oct. 22, 2024

(54) MERGING OBJECTS IN A SNAPSHOT MAPPING STRUCTURE CHARACTERIZING DATA DEPENDENCIES BETWEEN A STORAGE VOLUME AND ITS SNAPSHOTS

(71) Applicant: Dell Products L.P., Round Rock, TX (US)

(72) Inventors: Yosef Shatsky, Karnei Shomron (IL); Doron Tal, Geva Carmel (IL)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 17/721,584

(22) Filed: Apr. 15, 2022

(65) Prior Publication Data

US 2023/0334012 A1    Oct. 19, 2023

(51) Int. Cl.
   *G06F 16/11*    (2019.01)
(52) U.S. Cl.
   CPC ................................ *G06F 16/128* (2019.01)
(58) Field of Classification Search
   CPC .................................................... G06F 16/128
   See application file for complete search history.

(56) References Cited

U.S. PATENT DOCUMENTS

| | | |
|---|---|---|
| 8,688,935 B1 | 4/2014 | Yochai et al. |
| 9,141,290 B2 | 9/2015 | Hallak et al. |
| 11,500,837 B1 * | 11/2022 | Reaz ..................... G06F 16/215 |
| 11,797,478 B1 * | 10/2023 | Shatsky ................. G06F 3/067 |
| 2015/0134879 A1 * | 5/2015 | Zheng ................. G06F 11/1451 |
| | | 711/114 |
| 2018/0307736 A1 * | 10/2018 | Balakrishnan ...... G06F 16/2246 |
| 2019/0073372 A1 * | 3/2019 | Venkatesan ......... G06F 11/1469 |
| 2021/0286760 A1 * | 9/2021 | Aldred ................. G06F 16/162 |
| 2021/0294774 A1 * | 9/2021 | Keller ................... G06F 16/125 |
| 2021/0294775 A1 * | 9/2021 | Keller ................. G06F 16/1734 |

(Continued)

OTHER PUBLICATIONS

NVM Express, "NVM Express Base Specification, Revision 2.0a," NVM Express, Jul. 23, 2021, 454 pages.

(Continued)

*Primary Examiner* — Robert W Beausoliel, Jr.
*Assistant Examiner* — Susan F Rayyan
(74) *Attorney, Agent, or Firm* — Ryan, Mason & Lewis, LLP

(57) ABSTRACT

An apparatus comprises a processing device configured to receive a request to perform merging in a snapshot mapping structure comprising objects representing a given storage volume and its snapshots. The objects are organized in a tree structure representing data dependencies between the given storage volume and its snapshots. The processing device is also configured to analyze the snapshot mapping structure to identify ones of the objects that are candidates for deletion and to determine merge groups. A given one of the merge groups includes (i) at least a subset of the objects identified as candidates for deletion and (ii) a given object that is a child object of at least one of the subset of the objects identified as candidates for deletion. The processing device is further configured to perform merging in the snapshot mapping structure by merging data items in the given merge group to one of its objects.

20 Claims, 13 Drawing Sheets

(56) References Cited

U.S. PATENT DOCUMENTS

| | | | | |
|---|---|---|---|---|
| 2023/0123479 A1* | 4/2023 | Huang | .................. | H04L 1/1854 370/329 |
| 2023/0244633 A1* | 8/2023 | Van Dyck | ............. | G06F 16/128 707/663 |
| 2023/0273897 A1* | 8/2023 | Van Dyck | ............. | G06F 16/125 707/665 |

OTHER PUBLICATIONS

Dell EMC, "Introduction to the Dell EMC XtremIO X2 Storage Array: A Detailed Review," White Paper, Nov. 2019, 59 pages.

Dell Technologies, "Dell EMC PowerStore: Snapshots and Thin Clones," White Paper, Nov. 2021, 42 pages.

Dell Technologies, "Dell EMC Unity: Snapshots and Thin Clones," A Detailed Review, Jun. 2021, 38 pages.

EMC2, "Next-Generation Storage Efficiency with EMC Isilon SmartDedupe," White Paper, Apr. 2015, 24 pages.

Dell Technologies, "Dell Protection with Dell PowerScale SnapshotIQ," Technical White Paper, Mar. 2022, 32 pages.

C. Mavromatis, "The Union of Snapshot-Based Backup Technology and Data Deduplication," EMC Proven Professional Knowledge Sharing, 2010, 38 pages.

W. Zhang et al., "VM-Centric Snapshot Deduplication for Cloud Data Backup," 31st Symposium on Mass Storage Systems and Technologies, Jun. 2015, 12 pages.

\* cited by examiner

600

| FIELD | SIZE | NOTES |
|---|---|---|
| 8 KILOBYTE (KB) POSITION | 5 BYTES | A POSITION/OFFSET IN THE VOLUME TREE (VTREE) AT 8KB GRANULARITY. UPDATES THAT ARE SMALLER THAN 8KB WILL MARK A CHANGE IN THE FULL 8KB. SIZE SUPPORTS VTREES UP TO 8 PEBIBYTES (PiB) |
| PACK NUMBER (PACK_NUM) | 1 BYTE | DETERMINES THE LOCATION IN THE INDEX VECTOR (PACK_NUM * 32) |
| BITMAP | 4 BYTES | A SERIES OF BITS EACH INDICATING IF THE INDEX "PACK_NUM + BIT INDEX" HAS NEW DATA |

FIG. 6

| OFFSET | BEFORE SNAPSHOT S1 (VSID=0) | VOL (VSID=1) | S1 (VSID=2) |
|---|---|---|---|
| 0-8KB | 1 | 0 | 0 |
| 8-16KB | 1 | 1 | 0 |
| 16-24KB | 1 | 0 | 1 |
| 24-32KB | 0 | 1 | 1 |
| 32-40KB | 1 | 0 | 0 |
| 40-48KB | 1 | 0 | 0 |
| 48-56KB | 1 | 0 | 0 |
| 56-64KB | 0 | 1 | 0 |

FIG. 7A

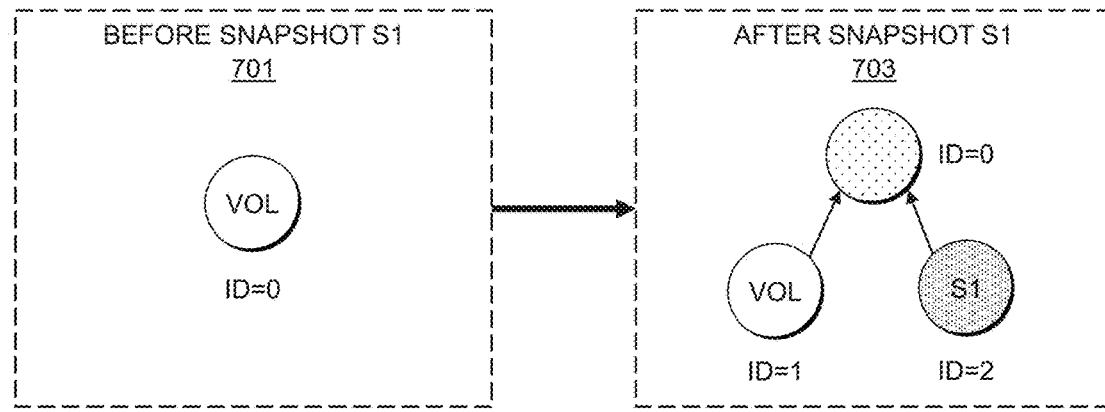
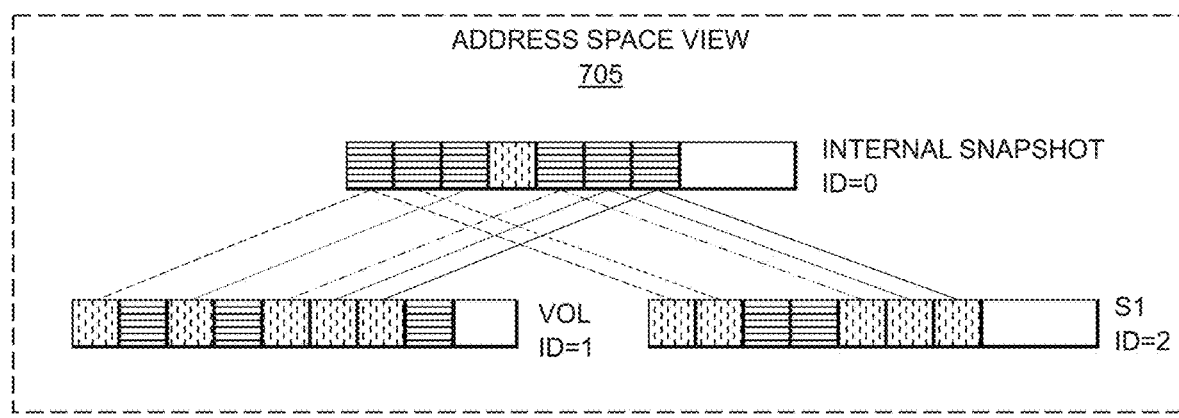
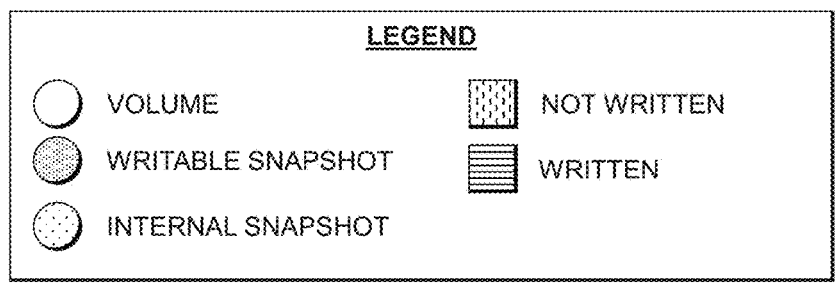
FIG. 7B

MERGING OBJECTS IN A SNAPSHOT MAPPING STRUCTURE CHARACTERIZING DATA DEPENDENCIES BETWEEN A STORAGE VOLUME AND ITS SNAPSHOTS

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for performing merging of objects in a snapshot mapping structure characterizing data dependencies between a storage volume and its snapshots.

In one embodiment, an apparatus comprises at least one processing device comprising a processor coupled to a memory. The at least one processing device is configured to perform the step of receiving a request to perform merging of a plurality of objects in a snapshot mapping structure associated with a given storage volume, the plurality of objects representing the given storage volume and a plurality of snapshots of the given storage volume, the plurality of objects being organized in a tree structure representing data dependencies between the given storage volume and the plurality of snapshots. The at least one processing device is also configured to perform the steps of analyzing the snapshot mapping structure to identify ones of the plurality of objects that are candidates for deletion and determining one or more merge groups, a given one of the one or more merge groups comprising two or more of the plurality of objects, the two or more objects in the given merge group comprising (i) at least a subset of the plurality of objects identified as candidates for deletion and (ii) a given one of the plurality of objects that is a child object of at least one of the subset of the plurality of objects identified as candidates for deletion. The at least one processing device is further configured to perform the step of performing merging of the plurality of objects in the snapshot mapping structure by merging data items in the given merge group to a selected one of the two or more objects in the given merge group.

These and other illustrative embodiments include, without limitation, methods, apparatus, networks, systems and processor-readable storage media.

BRIEF DESCRIPTION OF THE DRAWINGS

FIG. 6 is a table showing an example of a mapping structure for a volume tree in an illustrative embodiment.

FIGS. 7A and 7B show an example of a portion of a mapping structure and associated volume tree in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
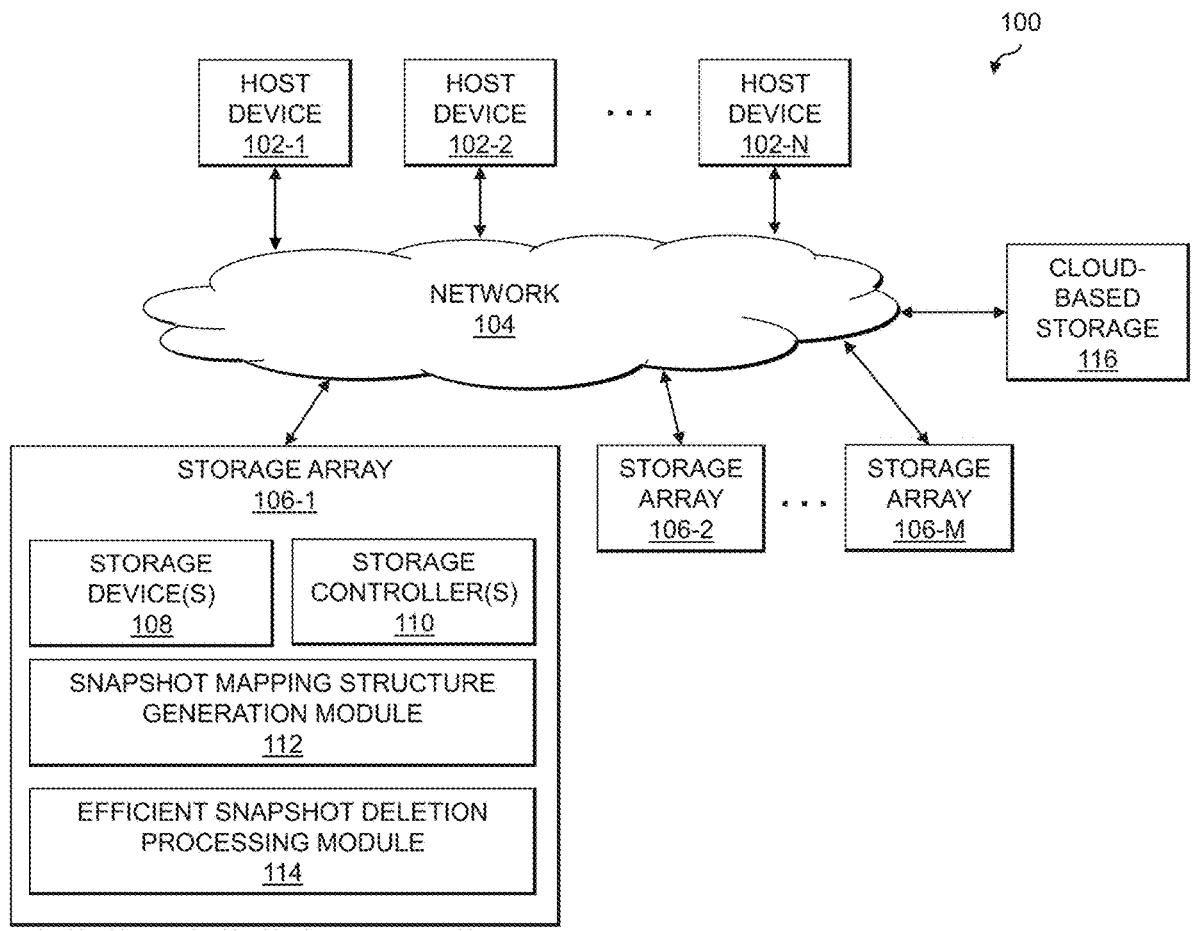
FIG. 1 is a block diagram of an information processing system for processing operations directed to a storage volume or snapshots thereof utilizing a snapshot mapping structure that characterizes data dependencies between the storage volume and its snapshots in an illustrative embodiment.

FIG. 1 shows an information processing system 100 configured in accordance with an illustrative embodiment to provide functionality for processing operations directed to a storage volume or snapshots thereof utilizing a snapshot mapping structure that characterizes data dependencies between the storage volume and its snapshots, and for performing merging of objects in the snapshot mapping structure, where the merging of objects in the snapshot mapping structure may also be referred to as performing cleanup of the snapshot mapping structure. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (TO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "TO" should be understood to refer to input and/or output. Thus, an TO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM), magnetic RAM (MRAM), resistive RAM (RRAM), etc. These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108. In some embodiments, the storage array 106-1 is assumed to comprise a persistent memory that is implemented using a flash memory or other type of non-volatile memory of the storage array 106-1. The persistent memory is further assumed to be separate from the storage devices 108 of the storage array 106-1, although in other embodiments the persistent memory may be implemented as a designated portion or portions of one or more of the storage devices 108.

In some embodiments, the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit TO operations to be processed by the storage cluster. Different ones of the storage arrays 106 may be associated with different sites. For example, the storage array 106-1 may be at a first site while the storage array 106-2 may be at a second site that is potentially geographically remote from the first site.

At least one of the storage controllers of the storage arrays 106 (e.g., the storage controller 110 of storage array 106-1) is assumed to implement functionality for intelligent snapshot management for volumes and snapshots that are created across the storage devices 108 of the storage array 106-1, across multiple ones of the storage arrays 106, between a storage cluster comprising the storage arrays 106 and one or more external storage systems such as cloud-based storage 116, etc. Such intelligent snapshot management is provided via a snapshot mapping structure generation module 112 and an efficient snapshot deletion processing module 114.

The snapshot mapping structure generation module 112 is configured to maintain a snapshot mapping structure for a given storage volume. The snapshot mapping structure comprises a plurality of objects representing the given storage volume and its snapshots. The plurality of objects are organized in a tree structure (also referred to herein as a volume tree or VTree) representing data dependencies between the given storage volume and its snapshots. Each of the plurality of objects comprises a dynamic bitmap indicating whether that object contains new data for different offset positions relative to one or more ancestor objects for that object in the tree structure. The snapshot mapping structure generation module 112 is also configured to detect one or more operations directed to a specified one of the given storage volume and a given one of the snapshots, to parse the snapshot mapping structure to identify respective ones of the plurality of objects in the snapshot mapping structure to utilize for processing the one or more operations, and to process the one or more operations utilizing the dynamic bitmaps of the identified ones of the plurality of objects in the snapshot mapping structure.

The efficient snapshot deletion processing module 114 is configured to receive a request to perform merging of a plurality of objects of the snapshot mapping structure, the plurality of objects representing a given storage volume and its snapshots as described above. The efficient snapshot deletion processing module 114 is also configured to analyze the snapshot mapping structure to identify ones of the plurality of objects that are candidates for deletion and to determine one or more merge groups. A given one of the one or more merge groups comprises two or more of the plurality of objects, the two or more objects in the given merge group comprising (i) at least a subset of the plurality of objects identified as candidates for deletion and (ii) a given one of the plurality of objects that is a child object of at least one of the subset of the plurality of objects identified as candidates for deletion. The efficient snapshot deletion processing module 114 is further configured to perform merging of the plurality of objects in the snapshot mapping structure by merging data items in the given merge group to a selected one of the two or more objects in the given merge group.

Although in the FIG. 1 embodiment the snapshot mapping structure generation module 112 and the efficient snapshot deletion processing module 114 are shown as being implemented internal to the storage array 106-1 and outside the storage controllers 110, in other embodiments one or both of the snapshot mapping structure generation module 112 and the efficient snapshot deletion processing module 114 may be implemented at least partially internal to the storage controllers 110 or at least partially outside the storage array 106-1, such as on one of the host devices 102, on one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the snapshot mapping structure generation module 112 and the efficient snapshot deletion processing module 114.

At least portions of the functionality of the snapshot mapping structure generation module 112 and the efficient snapshot deletion processing module 114 may be implemented at least in part in the form of software that is stored in memory and executed by a processor.

As noted above, the storage arrays 106 in some embodiments are assumed to be part of a storage cluster. The storage cluster may provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 2.0a, July 2021, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 10 and 11.

It is to be understood that the particular set of elements shown in FIG. 1 for processing operations directed to a storage volume or snapshots thereof utilizing a snapshot mapping structure that characterizes data dependencies between the storage volume and its snapshots, and for performing merging of objects in the snapshot mapping structure, is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for processing operations directed to a storage volume or snapshots thereof utilizing a snapshot mapping structure that characterizes data dependencies between the storage volume and its snapshots will now be described in more detail with reference to the flow diagram of FIG. 2. It is to be understood that this particular process is only an example, and that additional or alternative processes for processing operations directed to a storage volume or snapshots thereof utilizing a snapshot mapping structure that characterizes data dependencies between the storage volume and its snapshots may be used in other embodiments.

In this embodiment, the process includes steps 200 through 206. These steps are assumed to be performed by the snapshot mapping structure generation module 112. The process begins with step 200, maintaining a snapshot mapping structure for a given storage volume. The snapshot mapping structure comprises a plurality of objects representing the given storage volume and one or more snapshots of the given storage volume. The plurality of objects are organized in a tree structure representing data dependencies between the given storage volume and the one or more snapshots. Each of the plurality of objects comprises a dynamic bitmap indicating whether that object contains new data for different offset positions relative to one or more ancestor objects for that object in the tree structure. Each of the one or more snapshots of the given storage volume may comprise one of: a writeable snapshot of one of the given storage volume and another one of the one or more snapshots; a read-only snapshot of one of the given storage volume and another one of the one or more snapshots; and an internal snapshot comprising data that is used by at least one of the given storage volume and one or more other ones of the one or more snapshots.

Each of the plurality of objects in the snapshot mapping structure may comprise a position field indicating a given offset in the tree structure, and a bitmap field comprising a series of bits indicating whether the given object has new data relative to its one or more ancestor objects in the tree structure at the given offset. Each of the plurality of objects may also comprise a pack number field indicating a given pack number, where the series of bits of the bitmap field indicate whether a given object has new data relative to its one or more ancestor objects in the tree structure at an index in an index vector of the tree structure that is a multiple of the given pack number. The given offset may comprise an integer multiple of a designated offset size. The designated offset size may be eight kilobytes, the position field may be five bytes, the pack number field may be one byte, and the bitmap field may be four bytes.

In step 202, one or more operations directed to a specified one of the given storage volume and a given one of the one or more snapshots are detected. The snapshot mapping structure is parsed in step 204 to identify respective ones of the plurality of objects in the snapshot mapping structure to utilize for processing the one or more operations. The one or more operations are processed in step 206 utilizing the dynamic bitmaps of the identified ones of the plurality of objects in the snapshot mapping structure.

A given one of the one or more operations may comprise a write operation, a read operation, a snapshot differential operation, a read-only snapshot creation operation, a writeable snapshot creation operation, a snapshot deletion operation, a snapshot restoration operation, and a resizing operation.

The write operation specifies data to be written to a specified address of the specified one of the given storage volume and the given snapshot. Step 204 may include identifying a given one of the plurality of objects corresponding to the specified one of the given storage volume and the given snapshot. Step 206 may include processing the write operation utilizing the given object by updating the dynamic bitmap of the given object to indicate that new data exists at the specified address of the specified one of the given storage volume and the given snapshot.

The read operation specifies data to be read from a specified address of the specified one of the given storage volume and the given snapshot. Step 204 may include determining whether a given one of the plurality of objects corresponding to the specified one of the given storage volume and the given snapshot has new data at the specified address relative to its one or more ancestor objects in the tree structure. Step 206 may include, responsive to determining that the given object has new data at the specified address relative to its one or more ancestor objects in the tree structure, processing the read operation utilizing the given object. Step 206 may also include, responsive to determining that the given object does not have new data at the specified address relative to its one or more ancestor objects, determining a closest one of the one or more ancestor objects that has new data at the specified address and processing the read operation utilizing the closest ancestor object that has new data at the specified address.

The snapshot differential operation is for finding the difference between the given snapshot and a specified one of the given storage volume and another one of the one or more snapshots. Step 204 may comprise identifying a closest common ancestor object of a first one of the plurality of objects corresponding to the given snapshot and a second one of the plurality of objects corresponding to the specified one of the given storage volume and the other one of the one or more snapshots. Step 206 may comprise processing the snapshot differential operation by identifying the difference between the given snapshot and the specified one of the given storage volume and the other one of the one or more snapshots as positions in the dynamic bitmaps of the first object and the second object which have changed relative to corresponding positions in the dynamic bitmap of the closest common ancestor object.

The read-only snapshot creation operation may be for a specified one of the given storage volume and the given snapshot. Step 204 may comprise identifying a given one of the plurality of objects corresponding to the specified one of the given storage volume and the given snapshot. Step 206 may comprise processing the read-only snapshot creation operation by: creating a new object in the tree structure as a child of the given object; associating the new object with the specified one of the given storage volume and the given snapshot; and associating the given object with a read-only snapshot of the specified one of the given storage volume and the given snapshot.

The writeable snapshot creation operation may be for a specified one of the given storage volume and the given snapshot. Step 204 may comprise identifying a given one of the plurality of objects corresponding to the specified one of the given storage volume and the given snapshot. Step 206 may comprise processing the writeable snapshot creation operation by: creating first and second new objects in the tree structure as a children of the given object; associating the first new object with the specified one of the given storage volume and the given snapshot; associating the second new object with a writeable snapshot of the specified one of the given storage volume and the given snapshot; and converting the given object to an internal snapshot object.

The snapshot deletion operation may be for the given snapshot, and step 204 may comprise identifying a given one of the plurality of objects corresponding to the given snapshot and identifying one or more descendant objects and one or more ancestor objects of the given object in the tree structure. Step 206 may comprise processing the snapshot deletion operation by comparing dynamic bitmaps of the given object, the one or more descendant objects, and the one or more ancestor objects to identify data in the given object that can be deleted. The identified data comprises (i) one or more data items at positions in the dynamic bitmap of the given object which are overwritten in corresponding positions of the dynamic bitmaps of the one or more descendant objects and (ii) one or more data items at positions in the one or more ancestor objects which were kept only for use by the given snapshot.

The snapshot restoration may be for the given snapshot, and step 204 may comprise identifying a given one of the plurality of objects corresponding to the given snapshot. Step 206 may comprise processing the snapshot restoration operation by creating a child object of the given object in the tree structure, and associating the child object with a restored volume of the given snapshot.

The resizing operation may be for a specified one of the given storage volume and the given snapshot, and step 204 may comprise identifying a given one of the plurality of objects corresponding to the specified one of the given storage volume and the given snapshot. Step 206 may comprise processing the resizing operation by adjusting a size of the specified one of the given storage volume and the given snapshot and updating metadata associated with the given object, the metadata indicating a smallest size of the specified one of the given storage volume and the given snapshot since its creation. Further operations involving the given object may limit propagation up the tree structure (e.g., for read operations directed to the specified one of the given storage volume and the given snapshot) to the smallest size of the specified one of the given storage volume and the given snapshot since its creation.

An exemplary process for performing merging of objects in a snapshot mapping structure characterizing data dependencies between a storage volume and its snapshots will now be described in more detail with reference to the flow diagram of FIG. 3. It is to be understood that this particular process is only an example, and that additional or alternative processes for performing merging of objects in a snapshot mapping structure characterizing data dependencies between a storage volume and its snapshots may be used in other embodiments.

In this embodiment, the process includes steps 300 through 306. These steps are assumed to be performed by the efficient snapshot deletion processing module 114. The process begins with step 300, receiving a request to perform cleanup or merging of a plurality of objects of a snapshot mapping structure associated with a given storage volume. The plurality of objects represent the given storage volume and a plurality of snapshots of the given storage volume. The plurality of objects are organized in a tree structure representing data dependencies between the given storage volume and the plurality of snapshots. In step 302, the snapshot mapping structure is analyzed to identify ones of the plurality of objects that are candidates for deletion.

One or more merge groups are determined in step 304. A given one of the one or more merge groups comprises two or more of the plurality of objects in the snapshot mapping structure. The two or more objects in the given merge group comprise (i) at least a subset of the plurality of objects identified as candidates for deletion and (ii) a given one of the plurality of objects that is a child object of at least one of the subset of the plurality of objects identified as candidates for deletion. Merging of the plurality of objects in the snapshot mapping structure is performed in step 306 by merging data items in the given merge group to a selected one of the two or more objects in the given merge group.

Each of the plurality of snapshots comprises one of: a writeable snapshot of one of: the given storage volume; and another one of the plurality of snapshots; a read-only snapshot of one of: the given storage volume; and another one of the plurality of snapshots; and an internal snapshot comprising data that is used by at least one of: the given storage volume; and one or more other ones of the plurality of snapshots. Step 302 may comprise identifying ones of the plurality of snapshots that are internal snapshots having a single child object in the tree structure. The given object in the given merge group that is the child object of said at least one of the subset of the plurality of objects identified as candidates for deletion represents one of the given storage volume, a writeable snapshot, a read-only snapshot, and an internal snapshot with two or more child objects in the tree structure. The two or more objects in the given merge group may comprise a chain of two or more of the subset of the plurality of objects identified as candidates for deletion, each of the objects in the chain having a single child object in the tree structure. Each of the objects in the chain may represent an internal snapshot.

The selected one of the two or more objects in the given merge group, to which data items are merged in step 306, may be the given object that is the child object of said at least one of the subset of the plurality of objects identified as candidates for deletion. The selected one of the two or more objects in the given merge group may alternatively be one of the subset of the plurality of objects identified as candidates for deletion. In some embodiments, the selected one of the two or more objects in the given merge group is the object with the most data item references among the two or more objects in the given merge group.

Step 306 may be performed responsive to detecting one or more designated trigger conditions. The one or more designated trigger conditions may comprise one or more of: determining that a threshold percentage of the plurality of objects represent internal snapshots; determining that the given merge group has at least a threshold number of objects; determining that the tree structure has at least a threshold depth and that at least a threshold percentage of the plurality of objects represent internal snapshots; and determining that at least a threshold period of time has passed since at least one of the two or more objects of the given merge group was identified as a candidate for deletion.

Figure 2:
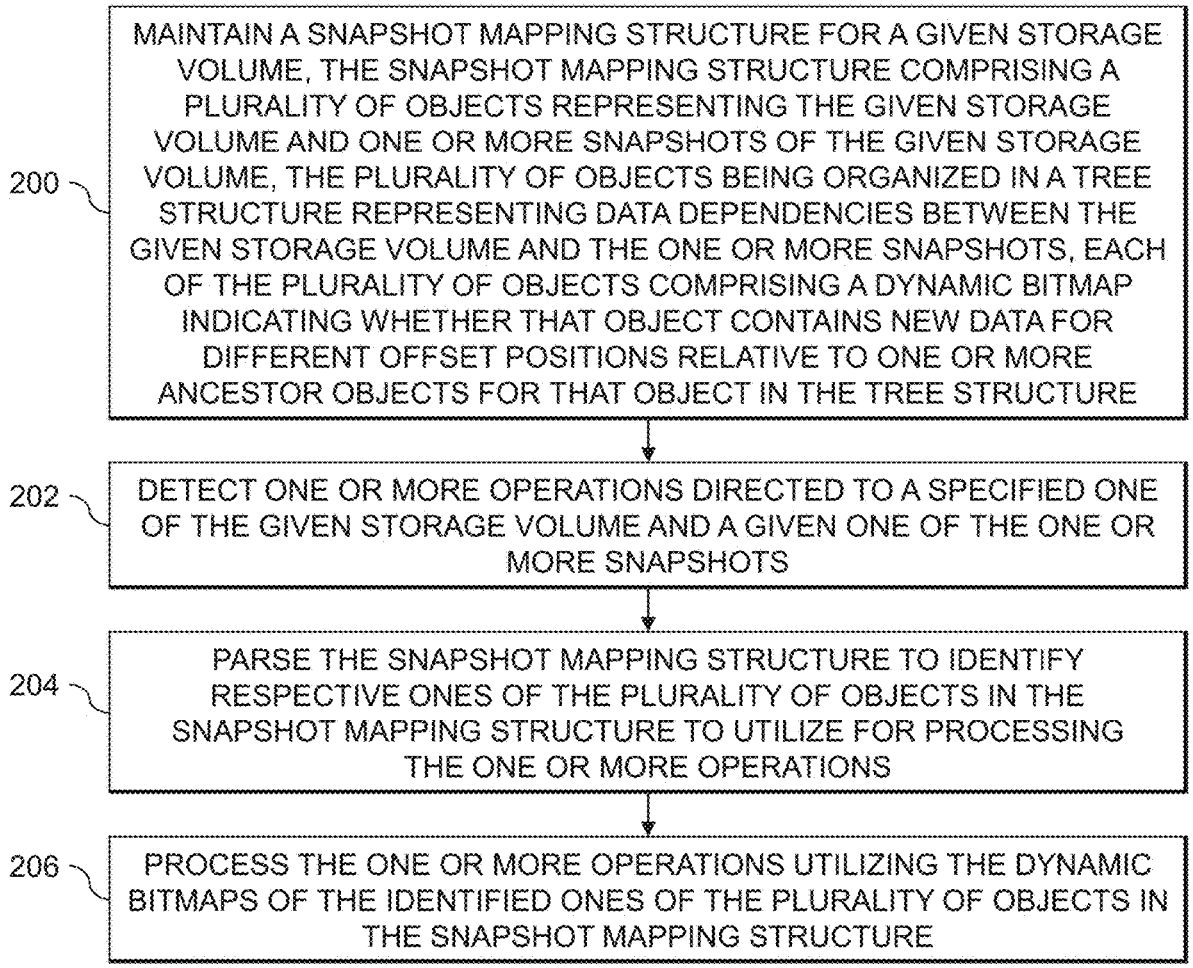
FIG. 2 is a flow diagram of an exemplary process for processing operations directed to a storage volume or snapshots thereof utilizing a snapshot mapping structure that characterizes data dependencies between the storage volume and its snapshots in an illustrative embodiment.
Figure 3:
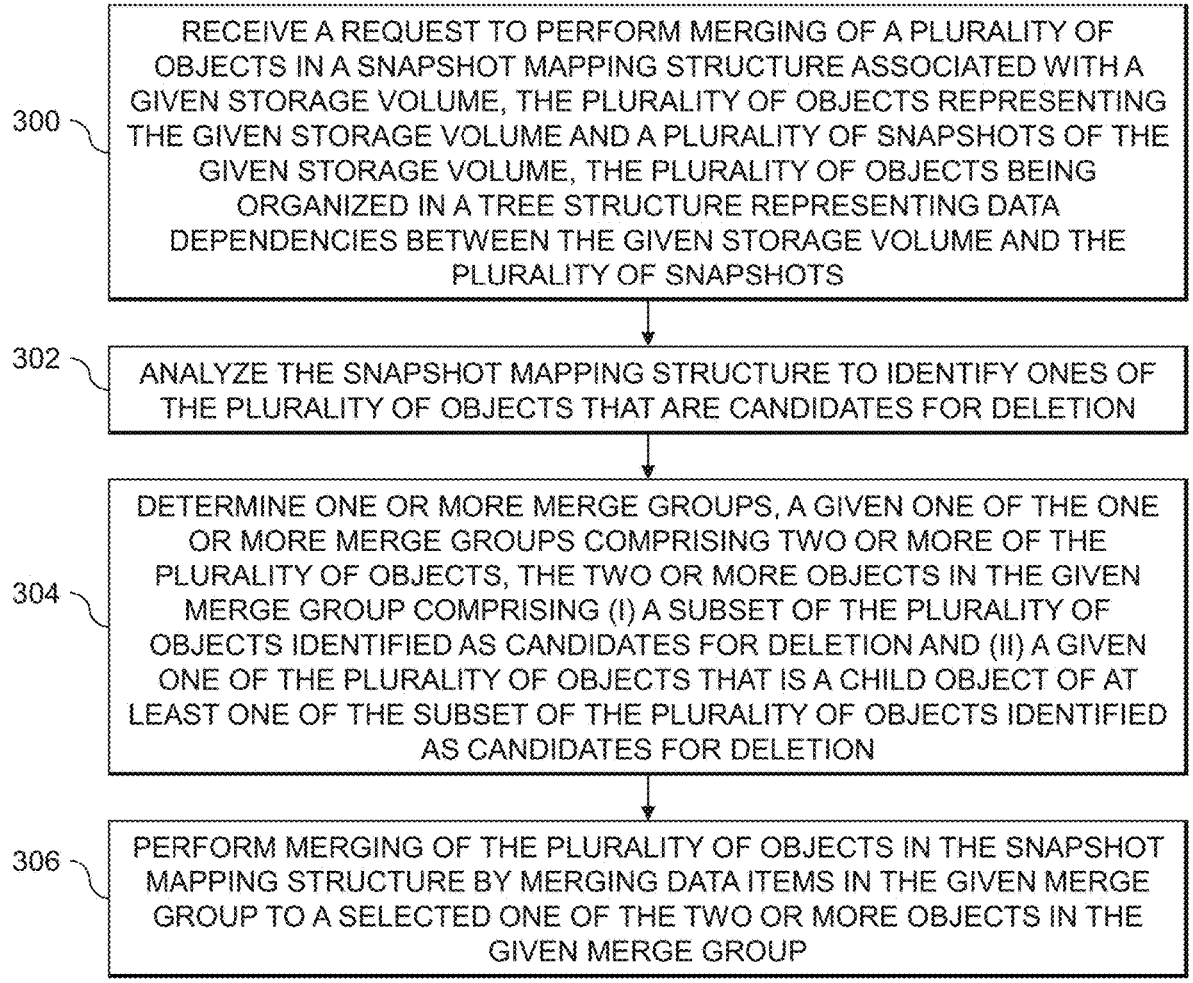
FIG. 3 is a flow diagram of an exemplary process for performing merging of objects in a snapshot mapping structure characterizing data dependencies between a storage volume and its snapshots in an illustrative embodiment.

The steps of the FIGS. 2 and 3 processes are shown in sequential order for clarity and simplicity of illustration only, and certain steps can at least partially overlap with other steps. Additional or alternative steps can be used in other embodiments.

The particular processing operations and other system functionality described in conjunction with the flow diagrams of FIGS. 2 and 3 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of data selection processes for respective different storage systems or different portions of one or more storage systems.

Functionality such as that described in conjunction with the flow diagrams of FIGS. 2 and 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Storage systems use snapshots to create point-in-time copies of storage volume. A snapshot may be read-only, and serve as a backup to improve the resiliency of the storage system. A snapshot may alternatively be writeable, in which case the original storage volume branches into two writeable instances—a volume and a writeable snapshot (e.g., such as in a virtual machine scenario). Creating a full copy of the storage volume when a snapshot (e.g., either a read-only or a writeable snapshot) is created is very costly, both in processing and in terms of storage capacity required. To avoid this overhead, the storage system may implement space efficient snapshots, for which only the differences between the source storage volume or snapshot and the snapshot thereof are stored. Such space efficient snapshots can be created very quickly, and have a minimal storage capacity overhead. Space efficient snapshots, however, are more complex to manage. Mechanisms are required to track what data is used by which snapshots, and when the data can be deleted.

Illustrative embodiments provide an implementation for space efficient snapshots that provides various advantages, such as in performance and scalability. In some embodiments, performance advantages include: (1) that IO to a storage volume having a snapshot exhibits the same or comparable performance as IO on a storage volume without a snapshot; (2) that IO to snapshots exhibits the same or comparable performance as IO on a storage volume without snapshots; (3) that snapshot creation is instantaneous or near-instantaneous (e.g., on the order of milliseconds); (4) that snapshot deletion results in instantaneous or near-instantaneous release (e.g., on the order of milliseconds), and eventual capacity release without restricting the creation of new snapshots; and (5) that snapshot differential determination is a metadata only operation, and is proportional to the size being compared. In some embodiments, scalability advantages include: (1) support for many snapshots (e.g., at least 4,000 snapshots per storage volume); and (2) that snapshots require "payment" only if used (e.g., there is no or minimal overhead in terms of memory, capacity or performance if snapshots are not used).

In some embodiments, the space efficient snapshot functionality described herein is based on a snapshot mapping structure which includes a bit per offset per snapshot indicating if the snapshot contains changes or not. If not, a read will propagate upward to its parent. The snapshot mapping structure, referred to herein as SnapMAP, is used to provide high performance for such reads. Details of the SnapMAP structure are discussed below, along with logic for its use in conjunction with various snapshot related processing flows (e.g., for read operations, write operations, snapshot creation operations, snapshot deletion operations, snapshot differential computation operations, snapshot restoration operations, snapshot resizing operations, etc.). The placement of the SnapMAP structure in architecture layers of a storage system is also described.

As used herein, a "storage volume" or "volume" refers to an independent volume that is created by a user and accessed by that user. The volume is created empty, with a size defined by the user. A volume has a lifespan that is independent of other volumes. A volume is always writeable.

As used herein, a "snapshot" refers to an entity similar to a volume in the sense that it can be mapped to a host and can serve IO operations. A snapshot differs from a volume because: its size and content are derived from the volume at the time it is created; it may be deleted when the volume is deleted; a volume can be restored from a snapshot; and a snapshot's written size only counts the areas that have diverged from the volume (e.g., the initial written size of a snapshot is 0).

As used herein, an "internal snapshot" refers to a snapshot that is preserved because other snapshots require its content. Internal snapshots are internal to the snapshot mechanism, and are not used by other data services. The user is not made aware of the existence of internal snapshots. Internal snapshots may be created for internal purposes (e.g., as a parent to a writeable snapshot), or may be a regular snapshot that was deleted and is now being preserved for internal use. Internal snapshots are logically read-only, but there are processes that rearrange their content without changing the end result of user reads (e.g., removing invalidated items). It is also permissible to delete items from an internal snapshot, as long as such items are not used by any of the descendants of that internal snapshot.

As used herein, a "volume tree" or "VTree" refers to a hierarchical structure managed by a control path that describes that data dependencies between a volume and its snapshots. A VTree contains exactly one volume, and any number of snapshots (e.g., up to a supported limit). When thin clones are used, a single VTree may contain many volumes. The limit of nodes per VTree applies to all copies and all snapshots in the same VTree. A VTree "node" is an aggregate name for volumes or snapshots, including internal snapshots. All these objects are represented as nodes in the VTree, and each node in the VTree is either a volume, a snapshot, or an internal snapshot.

Figure 4A:
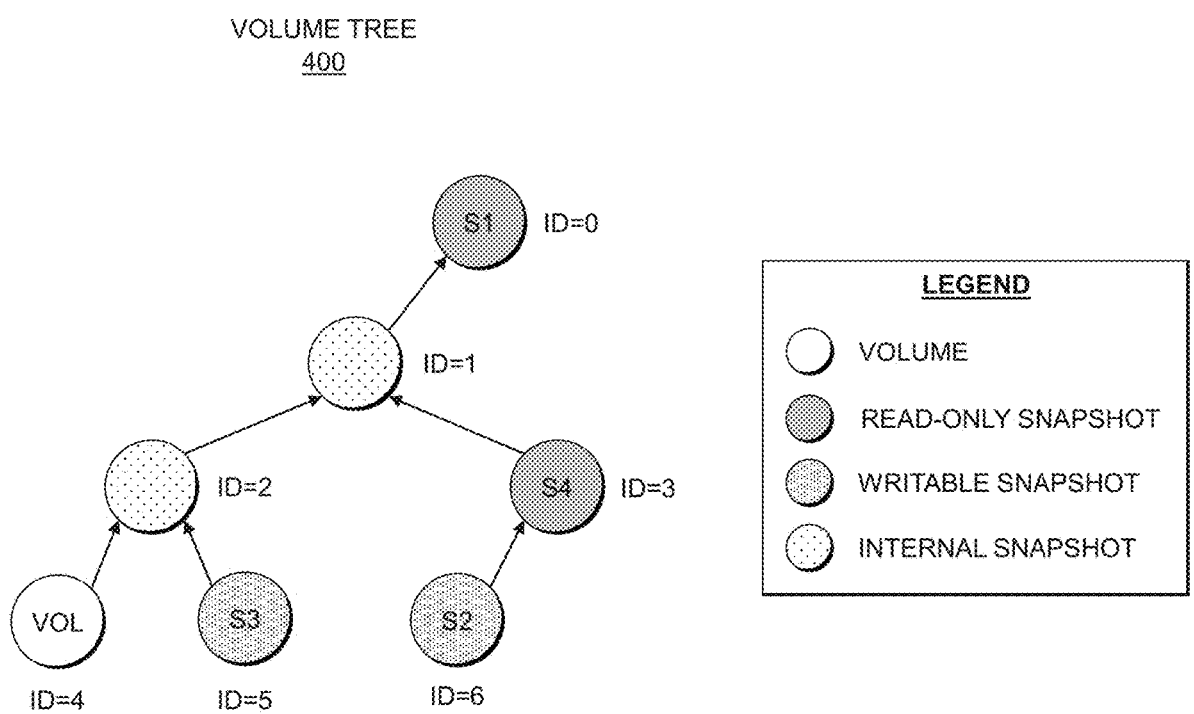
FIGS. 4A and 4B show creation of a volume tree in an illustrative embodiment.
Figure 4B:
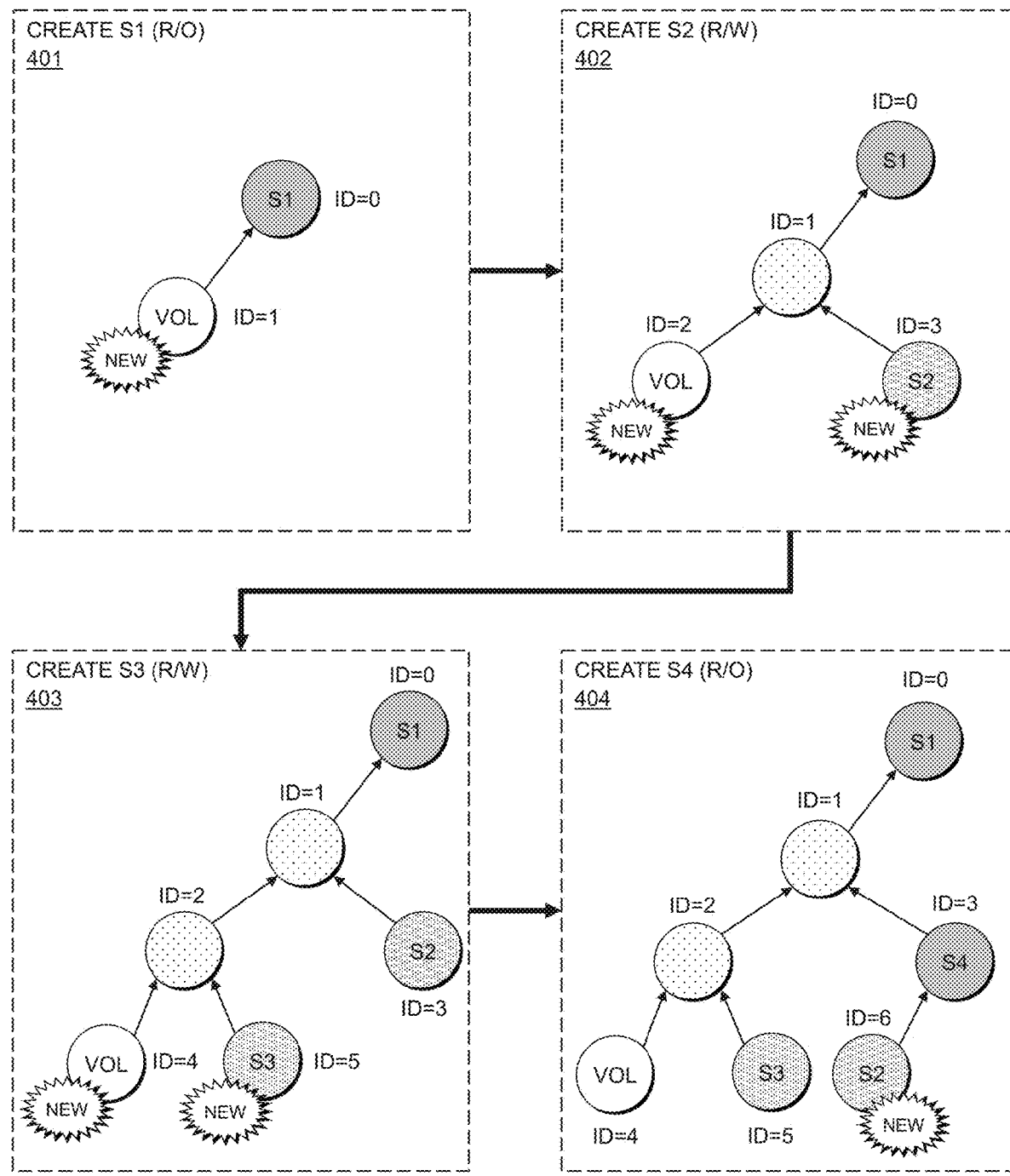

FIGS. 4A and 4B show an example of a VTree 400, along with the steps for creating the VTree 400 from an original volume (denoted "Vol"). In the FIG. 4A example, the VTree 400 includes: the volume ("Vol") with a node ID of 4; snapshots S1, S2, S3 and S4 with node IDs of 0, 6, 5 and 3, respectively; and two internal snapshots with node IDs of 1 and 2. The snapshots S1 and S4 are read-only snapshots, and the snapshots S2 and S3 are writeable snapshots. Nodes that are higher up in the VTree 400 are older, and contain data that is joint by its children at the moment of their creation. For example, the internal snapshot with node ID=1 contains data used by the internal snapshot with node ID=2 and the read-only snapshot S4 with node ID=3. Over time, the user may write new data, in which case the new data is stored in the leaf nodes. For example, writes to the writeable snapshot S3 are written to the node ID=5, thereby masking the data in the internal snapshot with node ID=2 at the same volume offset that was used by the writeable snapshot S3 until now. Before masking takes place, all nodes simply read data from their parent.

As noted above, the nodes that are higher up in the VTree 400 are a common denominator for their children. Because inner nodes may be used by multiple volumes or snapshots, they are read-only. It should be appreciated that creating a read-only snapshot S1 from the volume ("Vol") does not result in S becoming the volume's child. To the contrary, the read-only snapshot S1 is the parent that does not change, while the volume ("Vol") is the child that does change. In the VTree 400, leaf nodes change due to user writes. When creating a writeable snapshot S2 from the volume ("Vol"), both the writeable snapshot S2 and the volume ("Vol") become the children of an internal snapshot node that is read-only.

FIG. 4B show steps 401, 402, 403 and 404 for creating the VTree 400 shown in FIG. 4A. In step 401, the read-only snapshot S1 is created from the volume ("Vol"). Here, the read-only snapshot S1 is assigned node ID=0, and the volume node is "new" and assigned node ID=1. In the context of FIG. 4B, the "new" marking depicts a new node in the VTree 400, not necessarily a new volume or snapshot. The node IDs are assigned to each node in the VTree 400 when that node is created. In step 402, a writeable snapshot S2 of the volume ("Vol") is created. Here, a "new" volume node is created and assigned node ID=2, and a "new" writeable snapshot node for S2 is created and assigned node ID=3. The new nodes for the volume and the writeable snapshot S2 are created as children of the previous volume node with node ID=1, which becomes an internal snapshot node. In step 403, a writeable snapshot S3 of the volume ("Vol") is created. Here, a "new" volume node is created and assigned node ID=4, and a "new" writeable snapshot node for S3 is created and assigned node ID=5. The new nodes for the volume and the writeable snapshot S3 are created as children of the previous volume node with node ID=2, which becomes an internal snapshot node. In step 404, a read-only snapshot S4 of the writeable snapshot S2 is created. Here, a "new" writeable snapshot node for S2 is created and assigned node ID=6. The new node for the writeable snapshot S2 is created as a child of the previous writeable snapshot node with ID=3, which becomes the read-only snapshot node for the read-only snapshot S4.

Writing to the volume, or to a writeable snapshot, updates only one leaf node in the VTree 400. Reading is more complex, and may require retrieval of data from "older" nodes (e.g., parent or ancestor nodes), representing predecessors in the VTree 400. Continuing from the above example, assume a read is performed for the writeable snapshot S2. If the writeable snapshot S2's node (node ID=6) contains data at the address being read, that data is returned. If the writeable snapshot S2's node (node ID=6) does not contain data at the address being read, the node for the read-only snapshot S4 (node ID=3) is checked for data.

As long as no data is found, the scan continues up the VTree 400 until the root. For this example, if the node for the read-only snapshot S4 (node ID=3) does not contain the data, the internal snapshot node with node ID-1 is checked, and next the read-only snapshot with node ID=0 is checked. Such read lookups can be performed efficiently as described in further detail below.

Figure 5:
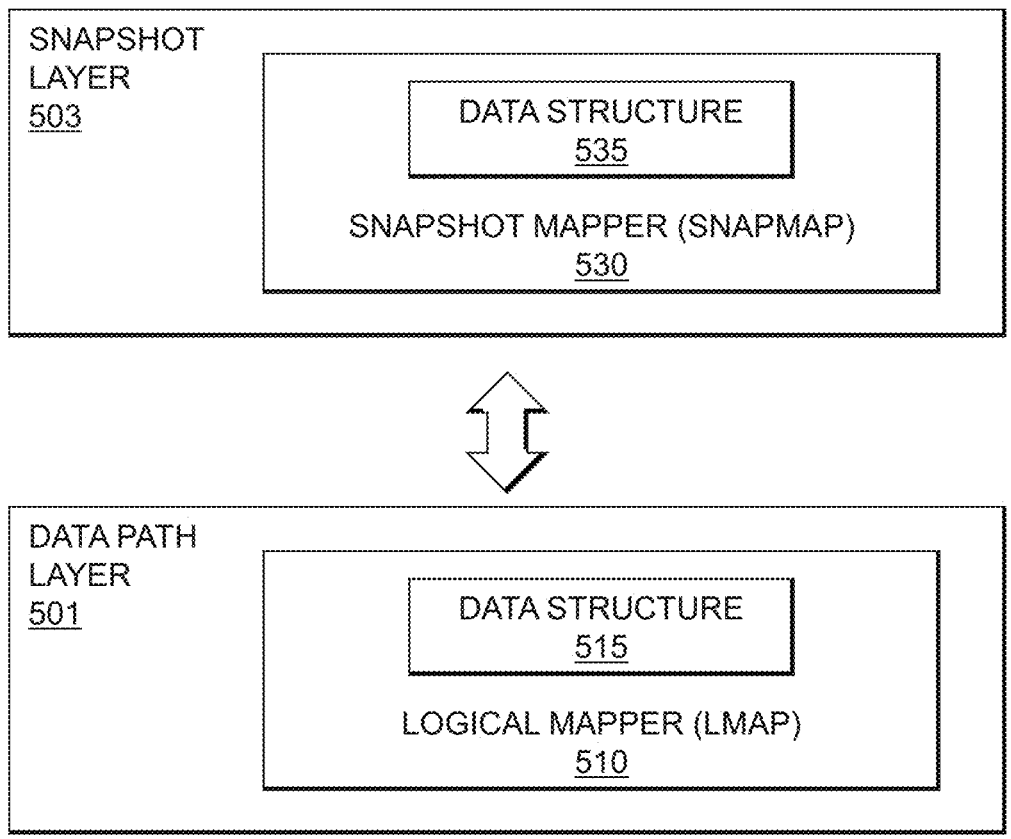
FIG. 5 shows an example of processing layers for implementing delta-based snapshots in an illustrative embodiment.

In some embodiments, a two-layer approach is utilized as shown in FIG. 5. The lower layer is a data path layer 501 (also referred to herein as a data layer 501), and the upper layer is a snapshot layer 503 that implements snapshots over the data layer 501. The separation into the data layer 501 and the snapshot layer 503 provides various advantages, such as in decoupling such components which are complex individually. Layer separation also allows for reusing a snapshot implementation over data layers of various storage systems. The data layer 501 includes, among other structure, a logical mapper (LMAP) 510. The LMAP 510 provides a data structure 515, which maps a logical address (e.g., the ID of a user volume and an offset within the volume) to the data stored at that location in the volume. This location may be a physical location on a disk, or may be a key to some other lookup table for more complex data paths. From the perspective of snapshots, the LMAP 510 can provide information about the actual location of data at any offset of any volume or snapshot. The LMAP 510 treats volumes and snapshots equally, using an identifier referred to as a Volume Snapshot ID (VSID) that is used to identify a volume or a snapshot. The ordering in the LMAP 510 is first based on the VSID, and then on the offset in the volume or snapshot. This is useful, because a sequential read/write does not want to needlessly jump over entries that belong to other volumes or snapshots.

While the LMAP 510 on its own could theoretically be used to implement snapshots, it would have bad performance because reading from a space efficient snapshot requires searching through other VTree nodes to find the data to return in the case data was not written to this snapshot directly. To solve this problem, a snapshot mapper (SnapMAP) 530 of the snapshot layer 503 is used with its own data structure 535. The SnapMAP 530 is sorted first by address, and then by VSID thereby allowing retrieval of information about all the nodes in the VTree very efficiently. The root of the VTree does not contain entries in the SnapMAP 530. If a volume has no snapshots, its associated SnapMAP 530 is empty and no overhead exists. This structure efficiently supports both the scenario of no snapshots, and thousands of snapshots per VTree.

To minimize the size of the data structure 535, the SnapMAP 530 is implemented using a dynamic bitmap. Each bit in the bitmap represents one of the nodes in the VTree. The index identification is provided by a separate vector. By way of example, the vector may be divided into packs of 32 entries each. A bitmap of a pack is 4 bytes. Each bit in the bitmap indicates if the corresponding node contains data or not. The SnapMAP 530's data structure 535 is composed of mini sections of 10 bytes each, which use the structure shown in the table 600 of FIG. 6. The SnapMAP 530 provides the data structure 535, which contains the items shown in the table 600 of FIG. 6, using the position as the key. This allows for finding all entries at a given position. The SnapMAP 530 should be ordered to allow for address scans. The SnapMAP 530 also benefits from having large node sizes (e.g., 4 KB or 8 KB) that can be efficiently swapped to a storage device (e.g., an SSD) from memory (e.g., RAM). The SnapMAP 530 is efficiently swappable in and out of memory because it is ordered by positions, and a random read will find all the metadata it requires stored in the same location. In some embodiments, a B+ tree is used as a container for the SnapMAP 530. In other embodiments, however, other types of containers may be used.

An example of creating a writeable snapshot (denoted S1) from a volume (denoted Vol) is shown in FIGS. 7A and 7B. Once the writeable snapshot S1 is created, both the volume and the writeable snapshot S1 are written to at various offsets as indicated in the table 700 of FIG. 7A. The table 700 shows different offsets for the structure before snapshot creation (VSID=0), and after snapshot creation for the volume (VSID=1) and the writeable snapshot (VSID=2). It should be noted that the bits for the root node (VSID=0) are not required to be stored by the SnapMAP 530, but are shown in the table 700 for clarity of illustration. FIG. 7B shows the VTree structure 701 before creation of the writeable snapshot S1, as well as the VTree structure 703 following creation of the writeable snapshot S1. FIG. 7B also shows an address space view 705, showing where data is written and not written in the internal snapshot, the volume, and the writeable snapshot S1. For offsets where data is not written in the volume or the writeable snapshot S1, that data is obtained from the internal snapshot.

Various operation flows using a snapshot mapping structure with a VTree will now be described. A write operation processing flow includes writing data, where data is only written to leaves of the VTree. The data is tagged with the VSID and the address within the VTree, and is stored to disk and to metadata structures, including via the LMAP 510. The SnapMAP 530 is updated as well to indicate that data now exists at the given VSID and offset. A read operation processing flow includes reading data, where the SnapMAP 530 is used to search up the VTree and find the first node that contains data. Once found, the read is sent to the data layer 501 using the discovered VSID and address.

A snapshot differential operation flow includes issuing a snapshot differential command to find the difference between two snapshots or volumes in the same VTree. This is accomplished by finding the first common ancestor in the VTree of the two snapshots or volumes. Positions for which neither copy has changed until a common ancestor (e.g., where the SnapMAP 530 is 0 or empty) are known to be identical. The granularity of the snapshot differential is the same granularity as the SnapMAP 530 (e.g., 8 KB).

A snapshot creation operation flow includes creating a read-only or writeable snapshot. To create a read-only snapshot, the current VTree node is frozen and an existing writeable volume or snapshot is pushed to be its child. When a writeable snapshot is created, the current node is frozen as an internal placeholder node, with the existing volume or snapshot becoming a child and the new writeable snapshot also becoming a child (e.g., as demonstrated in the example of FIGS. 7A and 7B).

A snapshot deletion operation flow includes deleting a snapshot. When deleting a snapshot, it is not easy to determine what data can be freed. There are various challenges to address, including: (1) determining what parts of a deleted snapshot must remain (e.g., because one or more child nodes require that data); and (2) determining what data may be released from ancestor nodes because it was being kept only for the snapshot that is now being deleted. For (1), the data is found by scanning the LMAP 510 or SnapMAP 530. If all the node's descendants have overwritten the data, it may be freed. Otherwise, it must be kept even though the snapshot it was written to is being deleted. It should be noted that this step is not relevant for writeable snapshots because writeable snapshots do not have descendant nodes. The operation (2) includes, for every offset in the deleted node that does not contain data, finding the parent that contains the data this snapshot would have read. Next, a check is performed to determine if the parent or any of its other descendants use the data. If not, it may be deleted.

A snapshot restoration operation flow includes restoring from a snapshot. This is accomplished by creating a new child under the snapshot to restore from, and pointing the volume to the VSID of the new child. The original copy of the volume may or may not be kept as a snapshot.

A volume resizing operation flow includes resizing a volume or snapshot. Because SnapMAP 530 is a space efficient structure, it only contains entries for packs that have bits set to a designated value (e.g., 1). All other addresses are assumed to be zero. In this respect, a solution is needed to handle cases in which the sizes of the VTree nodes are not equal, due to a volume resize that took place. For example, a snapshot may be created from a volume of size 500 GB, and then the volume size may be reduced to 400 GB. The size of the snapshot remains 500 GB. A read to address 450 GB from the volume must not search the parent, because this address space has diverged from the parent. Thus, when propagating upwards in the VTree, a check is performed at each node to determine whether the address is beyond the size of that node. If it is, propagation ends and no data (e.g., default data, such as zeroes) is returned.

Figure 8:
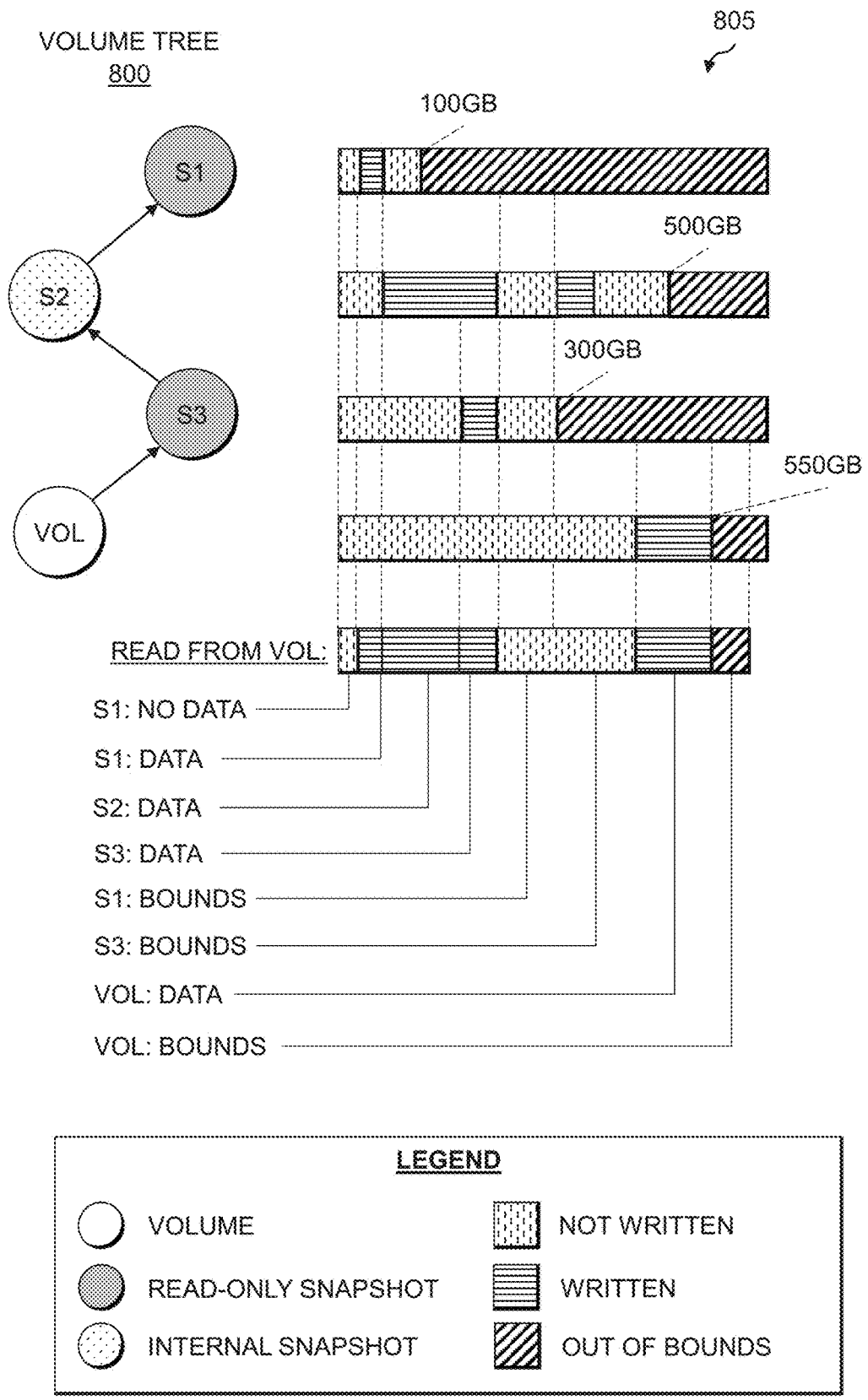
FIG. 8 shows a volume tree in which sizes of nodes are not different as a result of volume resizing operations in an illustrative embodiment.

FIG. 8 demonstrates volume resizing for a VTree 800 including a volume and three snapshots S1, S2 and S3. Here, S1 and S3 are read-only snapshots, and S2 is an internal snapshot. FIG. 8 also shows representations 805 of the volume and snapshots S1, S2 and S3, and what data is read from the volume (denoted "Vol") for various address ranges. It should be noted that, if a volume was shrunk and expanded back, the expanded area should be detached from its ancestors when read. In the FIG. 8 example, assume that before the snapshot S3 was taken, instead of the volume being shrunk to 300 GB it was shrunk to 10 GB and then was expanded to 300 GB. In this case, the range 10 GB-300 GB is all new in the read-only snapshot S3, and when reading from the volume at an offset of, for example, 90 GB, the read should not propagate up to the internal snapshot node S2. In some embodiments, metadata is added for each node in the VTree, indicating that node's minimize size that it ever had since it was created. The area below this minimum is permitted to propagate upward for reads. Past the minimum size value for the node, however, reads end with or without data being retrieved.

Illustrative embodiments provide solutions for enabling delta-based snapshots, which advantageously requires no overhead if snapshots are not used within a particular volume. The solutions described herein provide a novel snapshot mapping structure (e.g., the SnapMAP structure, including the dynamic bitmap and the use of packs), the ability to organize the snapshot mapping structure into pages (e.g., for easily moving in and out of memory), and the ability to handle volume and snapshot resizing operations.

Some conventional snapshotting approaches utilize a "generations" approach, where all changes are stored using a position as a first key and a volume or snapshot identifier "generation" as a second key. Such an approach, however, is not very scalable because there is a performance overhead for each volume and snapshot that is added—scanning the metadata requires reading much more information. The generations approach for snapshotting also has disadvantages in regards to deletion of snapshots, which is more complex because the metadata is stored with the metadata of all the volumes and snapshots. Further, snapshot differential operations are expensive in the generations approach, as it requires scanning a logical map which may contain many unrelated snapshots. Further, extra RAM or memory fields (e.g., for the "generation") are required for snapshots even when the snapshots are not used.

Other conventional snapshotting approaches are deduplication based, where deduplication functionality is used to determine where every offset in every snapshot points to. This is not typically done when the volume is created, because that requires creating an enormous number of references right up front. Instead, a generation-based strategy is often used for large "areas" of the snapshot, and deduplication is used within each area that has divergences. Such approaches, however, suffer from various problems including but not limited to: that the first write to an area is very expensive because it must create references for all offsets in the area; and snapshot deletion is very expensive because all the references must be deleted, including decreasing the reference counter that the data owner is holding.

In various embodiments described herein, a novel delta mapping based approach is utilized, which provides the snapshot mapping structure with the dynamic bitmap and the use of packs. The snapshot mapping structure, as noted above, provides the ability to organize the snapshot mapping structure into pages (e.g., for ease of swapping in and out of memory). Further, the solutions described herein provide mechanisms for handling volume resizing operations.

Snapshot deletion processing operations will now be described in further detail. Because the changes made to each snapshot or volume in a VTree are stored in a single node, it might seem like deletion of a given snapshot is a straightforward operation—requiring simple deletion of the data in the node that represents the snapshot to be deleted. Returning to the example of FIGS. 4A and 4B, consider deletion of the writeable snapshot S2, where deletion of that node in the VTree 400 will delete all the data items associated with the node ID=6. There are some deeper aspects to consider, however:

(1) When deleting a snapshot, that snapshot might have children in the VTree that require the data it contains. The data cannot be removed unless it is confirmed that none of the descendants refer to this data; and (2) When deleting a snapshot, it might free data stored in ancestor or parent nodes. This occurs when the snapshot being deleted is the only one using at least a portion of the data in such ancestor or parent nodes.

When a snapshot is deleted, the node in the VTree that represents that snapshot can only be deleted if that node has no children in the VTree. Otherwise, the node will remain in the VTree as an internal snapshot node, and it holds on to the data being used by its descendants. This, however, can lead to a VTree with many internal nodes, with the worst case being a chain of internal nodes with just one volume at the bottom of the VTree. This can happen, for example, when read-only snapshots are created and deleted regularly. Common use cases for this are backup snapshots, and snapshot-based replication. A long chain of internal snapshot nodes in the VTree structure has several disadvantages, including: (1) that propagation up a long VTree during a read becomes expensive, and is a performance disadvantage; (2) that performance of sequential reads is hurt if the data is spread over many nodes; (3) that if there is a limit on the number of nodes, the internal snapshot nodes reduce the number of supported snapshots; and (4) that it requires more metadata. Illustrative embodiments provide an approach for more efficient snapshot deletion, which involves intelligently merging the content of a node in a VTree that is to be deleted into its child node in the VTree.

In scenarios where snapshots are deleted often, the merge process will continuously move items from one node to another in the VTree. Deleting a first node moves its content to a second node, then deleting the second node moves its content to a third node, and so on. Much of this work is redundant. In illustrative embodiments, a novel method is used to select and perform the merge process for groups of nodes in the VTree, providing increased efficiency. A merge group is a chain of internal snapshot nodes in the VTree with a single child. The nodes in the merge group are all merged at once, thereby reducing the amount of merge work to be done overall.

A given node in a VTree may only be deleted once it no longer contains any items, hence any existing items in the given node must be moved to another node before the given node can be deleted. It should be noted that this movement is not necessarily data movement, and instead may require movement of metadata only. Even moving only the metadata, however, has a performance cost. Because deletion of a node may require the movement of many items, there are cases in which is it best not to delete an unused node. Moreover, it is more efficient to merge many nodes together, as opposed to merging only two nodes (e.g., one that is deleted, and one that remains).

An internal snapshot node being deleted may still contain items that serve one or more child nodes in the VTree. These items cannot be deleted—they must be moved somewhere else. Moving the items to a parent node is problematic for various reasons, including: (1) that the parent node may represent a user snapshot, and moving items into it changes its content; (2) that even if the parent node is an internal snapshot node, it may have other children that use its content preventing the option of changing its content; and (3) that if the node being deleted is an only child and the parent is an internal snapshot node as well, it is possible to move the content to the parent, but it makes more sense to delete the parent as well. For the above reasons, some embodiments decide to move items to a child of a node that is being deleted, as detailed below.

An internal snapshot node that has no children in a VTree can be removed relatively easily, because all its data is deleted. A node with a single child is more complex, because the deleted node's items must be moved to its child. Typically, a write to the child will delete the overridden item in the parent, but if that is not the case due to various implementation consideration, the merge process should skip such items.

For an internal snapshot node with two or more children, deleting that node is even more complex because its data needs to be moved to multiple child nodes. This can be done, but it requires additional metadata overhead, because metadata that was only in the parent must now be multiplied by the number of its children. This overhead may outweigh the benefit of reducing the number of nodes in the VTree. It should be noted that the above overhead is limited only to metadata, assuming that the child nodes are capable of referencing the same data via a reference counting mechanism (e.g., a deduplication mechanism). Otherwise, the data must be physically copied which is even more expensive. Because this case refers to multiple children for a given internal snapshot node, this means that the number of internal snapshot nodes is less than 50%. The motivation to delete internal snapshot nodes is increased when there are relatively many internal snapshot nodes in relation to the number of user nodes (e.g., read-only or writeable snapshot nodes, and volume nodes) in the VTree. Since here this is not the case, some embodiments focus on a solution that is optimized for the case of a single child.

An internal snapshot node with a single child may be deleted after moving its content to its child. If its child can also be deleted (e.g., it is also an internal snapshot node with a single child), it would be a waste to move that metadata to it. Some embodiments instead merge such nodes all at once, and move the metadata to the downmost child node that is not being deleted. This ability of group merging can save considerable resources, and works well when a VTree has many internal snapshot nodes.

The group merge is not merely a parallel merge, it is a combined process that reduces the amount of work. All source nodes in the merge group are read, and their items are written to a single destination node. For every offset, only one source node is valid, and is written to the single destination node. The logic used to determine merge groups is as follows. The VTree is traversed, looking for internal snapshot nodes with a single child. Once a node meeting this criteria is found, that node and its child are added to a merge group. The VTree traversal continues, moving down to the child and adding its child if it is also a single child internal snapshot node. If the node arrived at is not an internal snapshot node, or has more than one child, that node is added to the merge group and the search is ended (e.g., this is the last or bottommost node added to the merge group).

Figure 9:
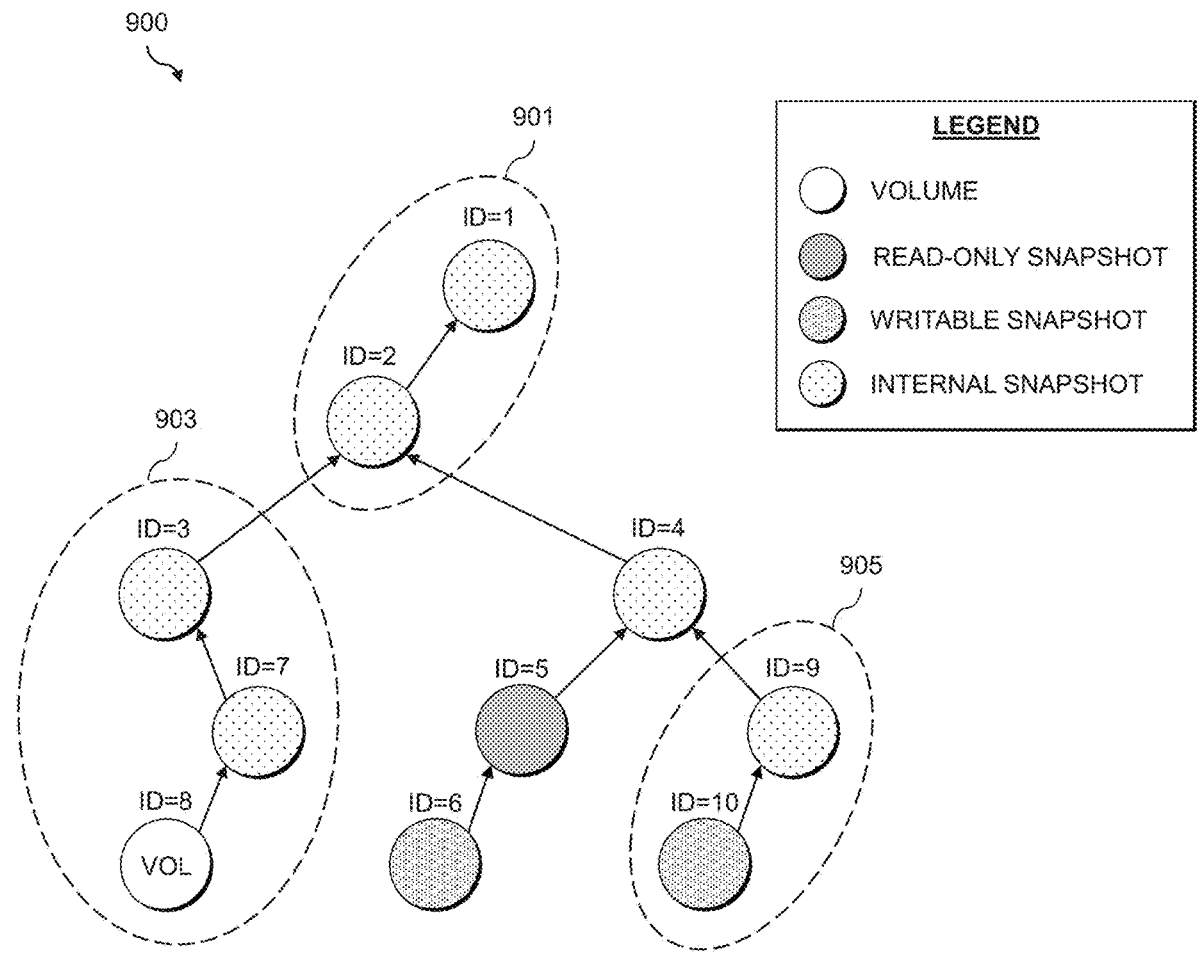
FIG. 9 shows an example grouping of nodes in a volume tree for space-efficient cleanup of snapshot objects in an illustrative embodiment.

FIG. 9 demonstrates merge groups in an example VTree 900 including nodes with node IDs 1 through 10. Node IDs 1, 2, 3, 4, 7 and 9 represent internal snapshot nodes. Node ID 5 represents a read-only snapshot node. Node IDs 6 and 10 represent writeable snapshot nodes. Node ID 8 represents a volume node. In the FIG. 9 example, there are three merge groups 901, 903 and 905. Merge group 901 includes the node ID=1, which is an internal snapshot node with a single child, node ID=2. Since node ID=2 has multiple child nodes (e.g., node ID=3 and node ID=4), the node ID=2 is the last node in the merge group 901. The merge group 903 includes the node ID=3, which is an internal snapshot node with a single child, node ID=7. The node ID=7 is also an internal snapshot node with a single child, node ID=8. Node ID=8 is a user node (e.g., a volume node), and is thus the last node in the merge group 903. The merge group 905 includes the node ID=9, which is an internal snapshot node with a single child, node ID=10. Node ID=10 is a user node (e.g., a writeable snapshot node), and is thus the last node in the merge group 905.

Having some internal nodes in a VTree is not an issue. In fact, it is often advantageous to not immediately merge internal nodes for various reasons, including: (1) that they create opportunities for group merging; and (2) fewer valid entries will remain in the internal snapshot node by the time it is merged (e.g., there will be fewer metadata items to copy). Various criteria may be used to determine when to begin merging nodes in a VTree. A base criterion may be to begin a merge if some threshold percentage (e.g., 80%) of the VTree is internal snapshot nodes. Other criteria may be used as well, in conjunction with or instead of the threshold percentage of internal snapshot nodes criteria. For example, merging may begin when a "large" chain or merge group is identified. A "large" chain or merge group may be one which includes at least some threshold number of nodes (e.g., at least three nodes). Merging may also or alternatively begin when there are many internal snapshot nodes, such that the VTree has some threshold depth (e.g., or more nodes, of which 30% or more are internal snapshot nodes). Merging may further or alternatively begin to avoid a "starvation"

condition, where a starvation condition refers to an internal snapshot node that has been waiting for a merge for more than some threshold period of time (e.g., 7 days or longer). It should be appreciated that any combination of the above and potentially other criteria may be used to initiate merging of nodes in a VTree. Merging of nodes in a VTree may also or alternatively be initiated in response to an explicit user request, in response to determining that there is some threshold amount of idle processing or other resources, etc. It should be further appreciated that the particular threshold values given above are presented by way of example only, and that embodiments are not limited to use with these specific threshold values.

The merge "destination" may be any one of the nodes in a given merge group, as long as the ability exists to rematch the merge chain's leaf snapshot to a new node ID. Using this ability, the merge destination may be chosen to be the node with the most entries, which can advantageously minimize the amount of work that a group merge requires.

Illustrative embodiments provide an efficient approach for snapshot deletion, by removing nodes in a VTree in an efficient manner that supports group deletion of nodes in the VTree. The solutions described herein provide a number of advantages, including the novel use of merge groups, trigger logic and criteria for initiating merge operations, and merge destination selection.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for processing operations directed to a storage volume or snapshots thereof utilizing a snapshot mapping structure that characterizes data dependencies between the storage volume and its snapshots, and for performing merging of objects in the snapshot mapping structure, will now be described in greater detail with reference to FIGS. 10 and 11. Although described in the context of system 100, these platforms may also be used to implement at least portions of other information processing systems in other embodiments.

Figure 10:
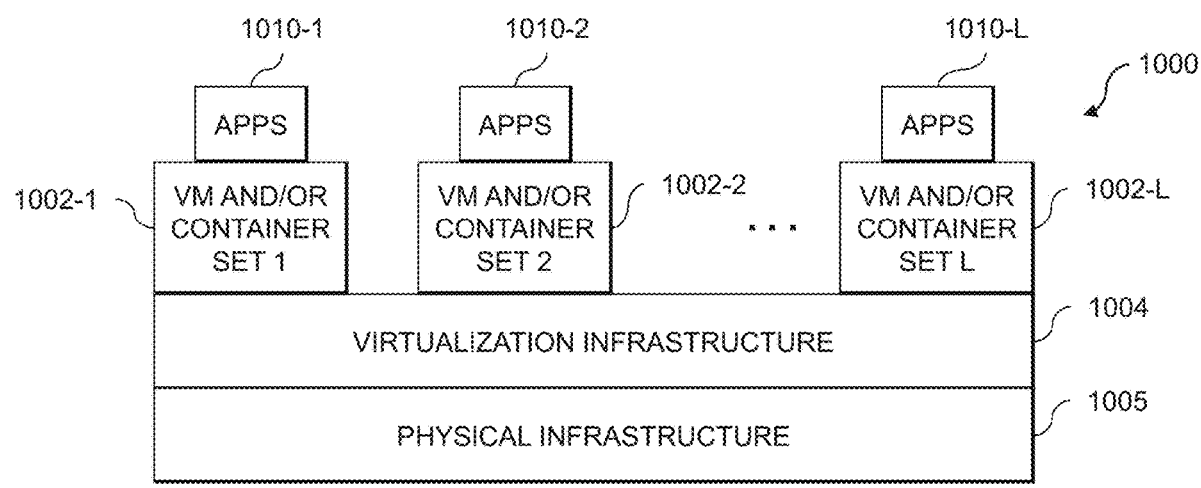
FIGS. 10 and 11 show examples of processing platforms that may be utilized to implement at least a portion of an information processing system in illustrative embodiments.
Figure 11:
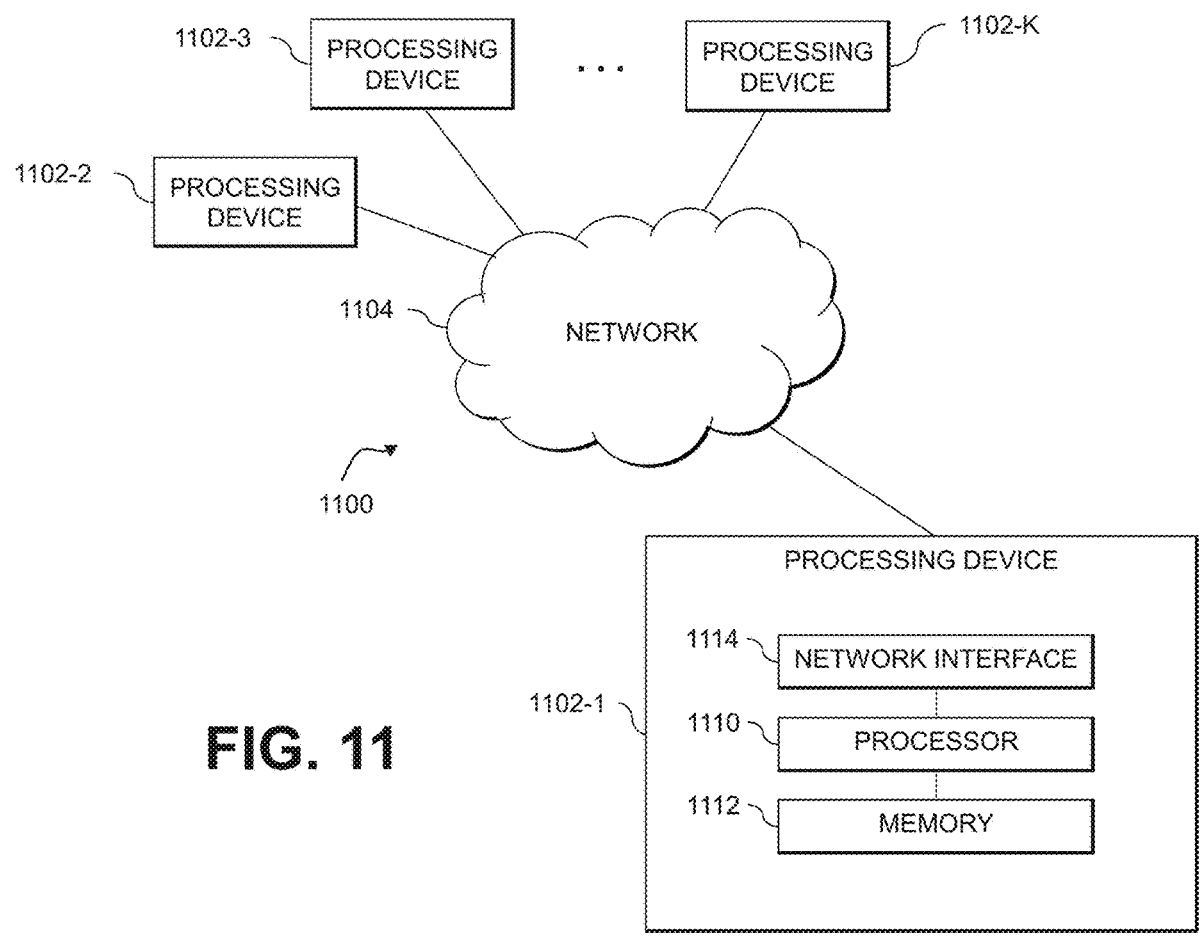

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for processing operations directed to a storage volume or snapshots thereof utilizing a snapshot mapping structure that characterizes data dependencies between the storage volume and its snapshots and the functionality for performing merging of objects in the snapshot mapping structure as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      receiving a request to perform merging of a plurality of objects in a snapshot mapping structure associated with a given storage volume, the plurality of objects representing the given storage volume and a plurality of snapshots of the given storage volume, the plurality of objects being organized in a tree structure representing data dependencies between the given storage volume and the plurality of snapshots;
      analyzing the snapshot mapping structure to identify ones of the plurality of objects that are candidates for deletion, wherein the identified ones of the plurality of objects that are candidates for deletion comprise ones of the plurality of objects which are nodes having a single child object in the tree structure;
      determining one or more merge groups, a given one of the one or more merge groups comprising two or more of the plurality of objects, the two or more objects in the given merge group comprising (i) a chain of two or more of the plurality of objects identified as candidates for deletion and (ii) a given one of the plurality of objects that is a child object of a last one of the chain of the two or more of the plurality of objects identified as candidates for deletion; and
      performing merging of the plurality of objects in the snapshot mapping structure by merging data items in the given merge group to a selected one of the two or more objects in the given merge group.

2. The apparatus of claim 1 wherein each of the plurality of snapshots comprises one of:
   a writeable snapshot of one of: the given storage volume; and another one of the plurality of snapshots;
   a read-only snapshot of one of: the given storage volume; and another one of the plurality of snapshots; and
   an internal snapshot comprising data that is used by at least one of: the given storage volume; and one or more other ones of the plurality of snapshots.

3. The apparatus of claim 2 wherein analyzing the snapshot mapping structure to identify ones of the plurality of objects that are candidates for deletion comprises identifying ones of the plurality of snapshots that are internal snapshots having a single child object in the tree structure.

4. The apparatus of claim 3 wherein the given one of the plurality of objects that is the child object of the last one of the chain of the two or more of the plurality of objects identified as candidates for deletion represents one of the given storage volume, a writeable snapshot, a read-only snapshot, and an internal snapshot with two or more child objects in the tree structure.

5. The apparatus of claim 1 wherein each of the objects in the chain represents an internal snapshot comprising data that is used by at least one of: the given storage volume; and one or more other ones of the plurality of snapshots.

6. The apparatus of claim 1 wherein the selected one of the two or more objects in the given merge group is the given one of the plurality of objects that is the child object of the last one of the chain of the two or more of the plurality of objects identified as candidates for deletion.

7. The apparatus of claim 1 wherein the selected one of the two or more objects in the given merge group is one of the two or more of the plurality of objects in the chain.

8. The apparatus of claim 1 wherein the selected one of the two or more objects in the given merge group is the object with the most data item references among the two or more objects in the given merge group.

9. The apparatus of claim 1 wherein performing the merging of the plurality of objects in the snapshot mapping structure is performed responsive to detecting one or more designated trigger conditions.

10. The apparatus of claim 9 wherein a given one of the one or more designated trigger conditions comprises determining that a threshold percentage of the plurality of objects represent internal snapshots comprising data that is used by at least one of: the given storage volume; and one or more other ones of the plurality of snapshots.

11. The apparatus of claim 9 wherein a given one of the one or more designated trigger conditions comprises determining that the given merge group has at least a threshold number of objects.

12. The apparatus of claim 9 wherein a given one of the one or more designated trigger conditions comprises determining that the tree structure has at least a threshold depth and that at least a threshold percentage of the plurality of objects represent internal snapshots comprising data that is used by at least one of: the given storage volume; and one or more other ones of the plurality of snapshots.

13. The apparatus of claim 9 wherein a given one of the one or more designated trigger conditions comprises determining that at least a threshold period of time has passed since at least one of the two or more objects of the given merge group was identified as a candidate for deletion.

14. The apparatus of claim 1 wherein performing the merging of the plurality of objects in the snapshot mapping structure is performed responsive to detecting:
that a threshold percentage of the plurality of objects represent internal snapshots comprising data that is used by at least one of: the given storage volume; and one or more other ones of the plurality of snapshots; and
that the chain of the two or more of the plurality of objects in the given merge group includes at least a threshold number of the plurality of objects.

15. A computer program product comprising a non-transitory processor-readable storage medium having stored therein program code of one or more software programs, wherein the program code when executed by at least one processing device causes the at least one processing device to perform steps of:
receiving a request to perform merging of a plurality of objects in a snapshot mapping structure associated with a given storage volume, the plurality of objects representing the given storage volume and a plurality of snapshots of the given storage volume, the plurality of objects being organized in a tree structure representing data dependencies between the given storage volume and the plurality of snapshots;
analyzing the snapshot mapping structure to identify ones of the plurality of objects that are candidates for deletion, wherein the identified ones of the plurality of objects that are candidates for deletion comprise ones of the plurality of objects which are nodes having a single child object in the tree structure;
determining one or more merge groups, a given one of the one or more merge groups comprising two or more of the plurality of objects, the two or more objects in the given merge group comprising (i) a chain of two or more of the plurality of objects identified as candidates for deletion and (ii) a given one of the plurality of objects that is a child object of a last one of the chain of the two or more of the plurality of objects identified as candidates for deletion; and
performing merging of the plurality of objects in the snapshot mapping structure by merging data items in the given merge group to a selected one of the two or more objects in the given merge group.

16. The computer program product of claim 15 wherein:
each of the plurality of snapshots comprises one of:
a writeable snapshot of one of: the given storage volume; and another one of the plurality of snapshots;
a read-only snapshot of one of: the given storage volume; and another one of the plurality of snapshots; and
an internal snapshot comprising data that is used by at least one of: the given storage volume; and one or more other ones of the plurality of snapshots; and
analyzing the snapshot mapping structure to identify ones of the plurality of objects that are candidates for deletion comprises identifying ones of the plurality of snapshots that are internal snapshots having a single child object in the tree structure.

17. The computer program product of claim 15 wherein performing the merging of the plurality of objects in the snapshot mapping structure is performed responsive to detecting:
that a threshold percentage of the plurality of objects represent internal snapshots comprising data that is used by at least one of: the given storage volume; and one or more other ones of the plurality of snapshots; and
that the chain of the two or more of the plurality of objects in the given merge group includes at least a threshold number of the plurality of objects.

18. A method comprising:
receiving a request to perform merging of a plurality of objects in a snapshot mapping structure associated with a given storage volume, the plurality of objects representing the given storage volume and a plurality of snapshots of the given storage volume, the plurality of objects being organized in a tree structure representing data dependencies between the given storage volume and the plurality of snapshots;
analyzing the snapshot mapping structure to identify ones of the plurality of objects that are candidates for deletion, wherein the identified ones of the plurality of objects that are candidates for deletion comprise ones of the plurality of objects which are nodes having a single child object in the tree structure;
determining one or more merge groups, a given one of the one or more merge groups comprising two or more of the plurality of objects, the two or more objects in the given merge group comprising (i) a chain of two or more of the plurality of objects identified as candidates for deletion and (ii) a given one of the plurality of objects that is a child object of a last one of the chain of the two or more of the plurality of objects identified as candidates for deletion; and
performing merging of the plurality of objects in the snapshot mapping structure by merging data items in the given merge group to a selected one of the two or more objects in the given merge group;
wherein the method is performed by at least one processing device comprising a processor coupled to a memory.

19. The method of claim 18 wherein:
each of the plurality of snapshots comprises one of:
a writeable snapshot of one of: the given storage volume; and another one of the plurality of snapshots;
a read-only snapshot of one of: the given storage volume; and another one of the plurality of snapshots; and
an internal snapshot comprising data that is used by at least one of: the given storage volume; and one or more other ones of the plurality of snapshots; and
analyzing the snapshot mapping structure to identify ones of the plurality of objects that are candidates for deletion comprises identifying ones of the plurality of snapshots that are internal snapshots having a single child object in the tree structure.

20. The method of claim 18 wherein performing the merging of the plurality of objects in the snapshot mapping structure is performed responsive to detecting:

that a threshold percentage of the plurality of objects represent internal snapshots comprising data that is used by at least one of: the given storage volume; and one or more other ones of the plurality of snapshots; and that the chain of the two or more of the plurality of objects in the given merge group includes at least a threshold number of the plurality of objects.

\* \* \* \* \*